(12) United States Patent
Dennes

(10) Patent No.: US 8,571,957 B1
(45) Date of Patent: *Oct. 29, 2013

(54) ELECTRONIC FINANCIAL TRANSACTION WAREHOUSE

(75) Inventor: Jeff Dennes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,675

(22) Filed: Jun. 26, 2012

Related U.S. Application Data

(63) Continuation of application No. 10/329,727, filed on Dec. 26, 2002, now Pat. No. 8,209,245.

(60) Provisional application No. 60/383,533, filed on May 28, 2002.

(51) Int. Cl.
*G06Q 40/00* (2012.01)

(52) U.S. Cl.
USPC .............................................. 705/35; 705/38

(58) Field of Classification Search
USPC ..................................................... 705/35, 38
See application file for complete search history.

(56) References Cited

U.S. PATENT DOCUMENTS

| 5,193,056 | A | 3/1993 | Boes |
| 6,047,268 | A | 4/2000 | Bartoli et al. |
| 6,868,391 | B1 | 3/2005 | Hultgren |
| 6,922,677 | B1 | 7/2005 | Sperandeo |
| 6,968,319 | B1 | 11/2005 | Remington et al. |
| 7,107,243 | B1 | 9/2006 | McDonald et al. |
| 2004/0122770 | A1 | 6/2004 | Craig et al. |

*Primary Examiner* — Thomas Dixon
*Assistant Examiner* — Benjamin S Fields
(74) *Attorney, Agent, or Firm* — Brooks, Cameron & Huebsch, PLLC

(57) ABSTRACT

A method of managing all personal financial accounts is accomplished by providing an electronically accessible repository containing financial asset and liability account information. The repository may be electronically accessed by various access channels for reviewing the status of any account in the repository, transferring an external account into the repository, creating a new account in the repository, transferring account adjustments into and out of the repository, making account adjustments within the repository, closing or deleting an account within the repository, presenting a bill to the repository, and paying a bill from one or more accounts in the repository.

20 Claims, 4 Drawing Sheets

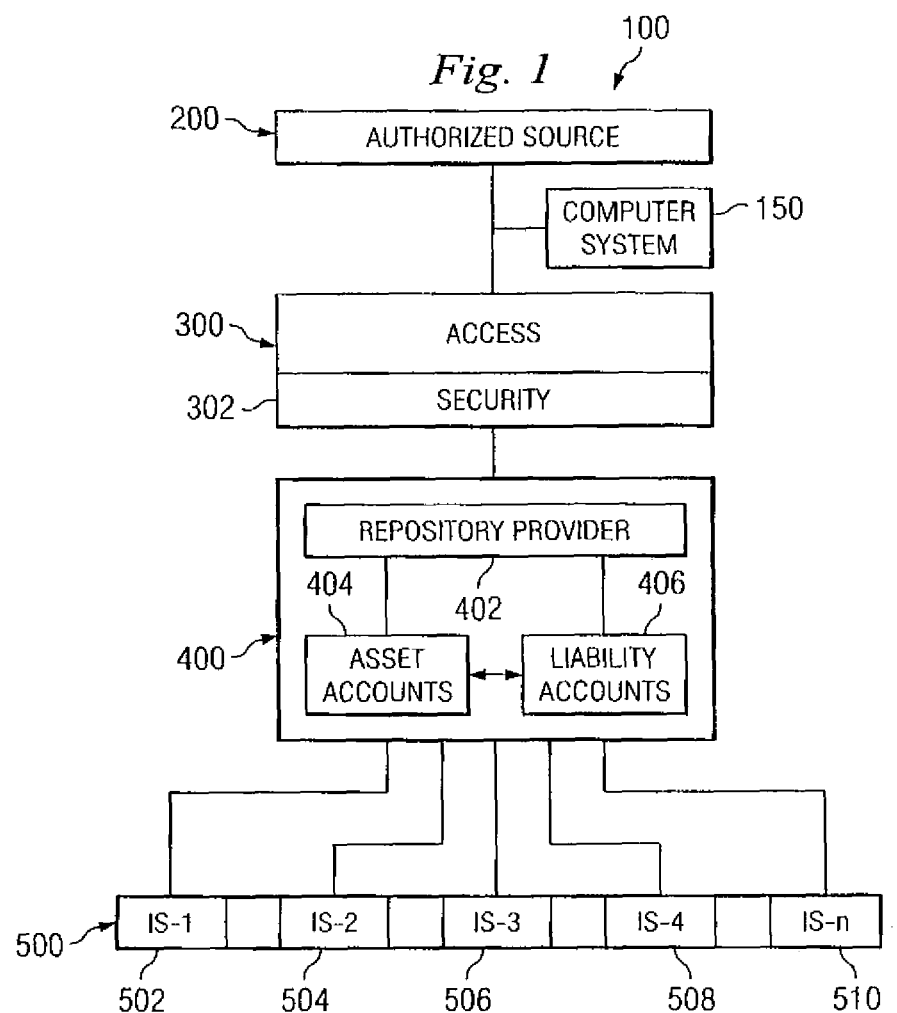
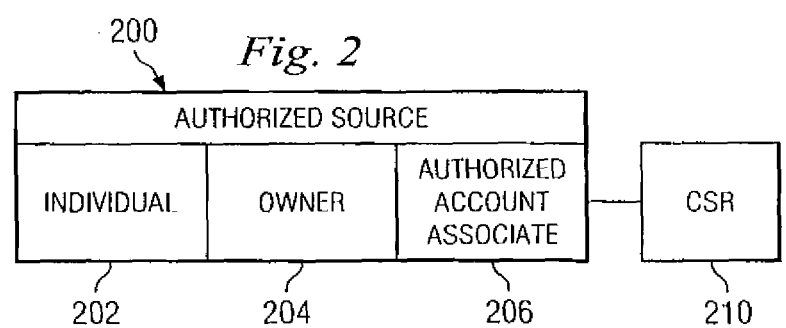

ELECTRONIC FINANCIAL TRANSACTION WAREHOUSE

CROSS-REFERENCE TO RELATED APPLICATION

This present patent application is a continuation of U.S. patent application Ser. No. 10/329,727, filed Dec. 26, 2002, now U.S. Pat. No. 8,209,245, which claims benefit of U.S. Provisional Patent Application No. 60/383,533, filed May 28, 2002.

BACKGROUND

The disclosures herein relate generally to financial transactions and more particularly to consolidating and managing personal financial data and information.

The management of personal business includes, for example, checking and savings accounts, loan accounts, life insurance, investments and credit card accounts.

Each of these items are ultimately controlled by an individual but in order to attend to interactive management of these items, the individual is and must be interfaced with financial institutions, i.e. banks, life insurance companies and securities institutions, as well as retailers with banking affiliations and with credit card companies.

As a result, the control and management of these items is accomplished by interactively tracking and communicating with various accounts through interfaces with many external financial associates. These accounts may include any type of asset or liability account. Some of these associates are creditors of the individual and some are not, but are financial asset service providers.

Thus, in order to monitor individual account information, periodic communication with these associates is required. This involves electronically processing each account through various account numbers, pin numbers and other levels of personal financial security.

Therefore, what is needed is a single repository of all such financial information which is accessible electronically for immediate current information with regard to personal financial account status, including both assets and liabilities, and interactively initiating adjustments to these accounts.

SUMMARY

One embodiment, accordingly, provides such a single repository. To this end, financial accounts can be managed by providing an accessible repository containing an inventory of financial asset and liability accounts with independent sources. The independent sources are related through the repository.

A principal advantage of this embodiment is that all accounts can be viewed and manipulated at a single location even though the accounts are provided through various independent sources.

BRIEF DESCRIPTION OF THE DRAWINGS

FIG. 1 is a diagrammatic view illustrating an embodiment of a financial transaction system.

FIG. 2 is a diagrammatic view illustrating an embodiment of an authorized source for the system.

DETAILED DESCRIPTION

Figure 3:
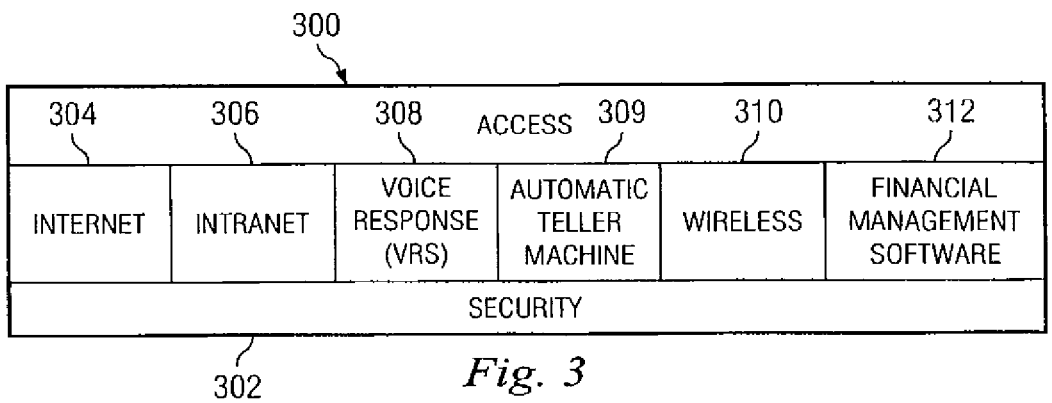
FIG. 3 is a diagrammatic view illustrating an embodiment of accessing a financial repository.

A method of managing financial accounts is designated 100 in FIG. 1, and includes an authorized source at 200. The authorized source 200 has access at 300 through a security device at 302 to a repository at 400. The repository 400 is provided by a financial management firm at 402. The repository 400 includes financial asset accounts at 404 and liability accounts at 406, having independent sources 500.

The authorized source 200, FIG. 2, may include for example, an individual at 202, an owner of the accounts at 204 and an authorized account associate at 206. The authorized account associate 206 may include for example, a customer service representative (CSR) at 210.

Access at 300 to the repository at 400 may be provided for example, via the Internet at 304, FIG. 3, the intranet at 306, a voice response system at 308, an automatic teller machine 309, a wireless device at 310 or through financial management software 312 provided in a computer system as discussed below.

Figure 4:
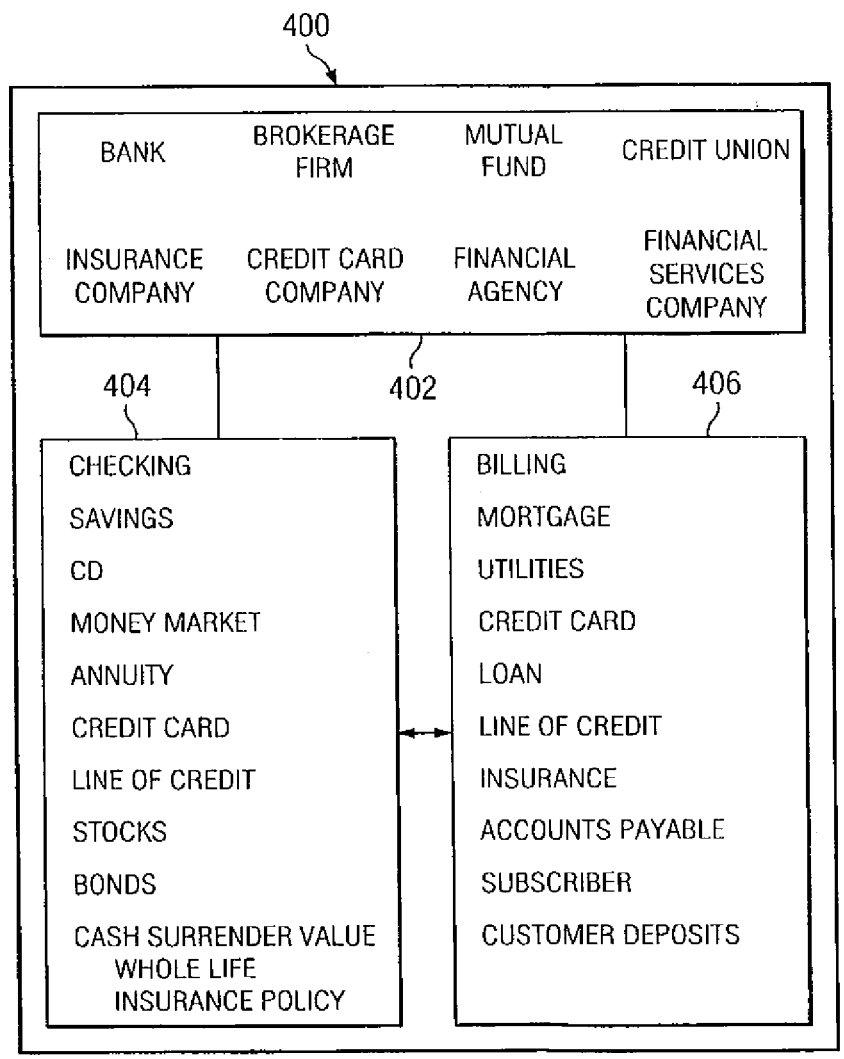
FIG. 4 is a diagrammatic view illustrating an embodiment of the financial repository.

The repository at 400, FIG. 4, includes the repository provider 402 such as a financial management firm. The types of firms include for example, a bank, a brokerage firm, a mutual fund, a credit union, an insurance company, a credit card company, a financial agency and a financial services company. The asset accounts 404 in the repository 400 may include for example, checking, savings, CD's, money market, annuity, credit card, line of credit, stocks, bonds, and a cash surrender value whole life insurance policy. The liability accounts 406 in the repository 400 may include for example, billing, mortgage, utilities, credit card, loan, line of credit, insurance, accounts payable, subscriber and customer deposits.

The independent sources 500, FIG. 1, may be one of the repository providers such as a bank, an insurance company, a utility company, a financial services company or a brokerage firm which provides one or more of the asset and/or liability accounts. There may be several independent sources such as those designated IS-1 at 502, IS-2 at 504, IS-3 at 506, IS-4 at 508, and IS-n at 510.

Figure 5:
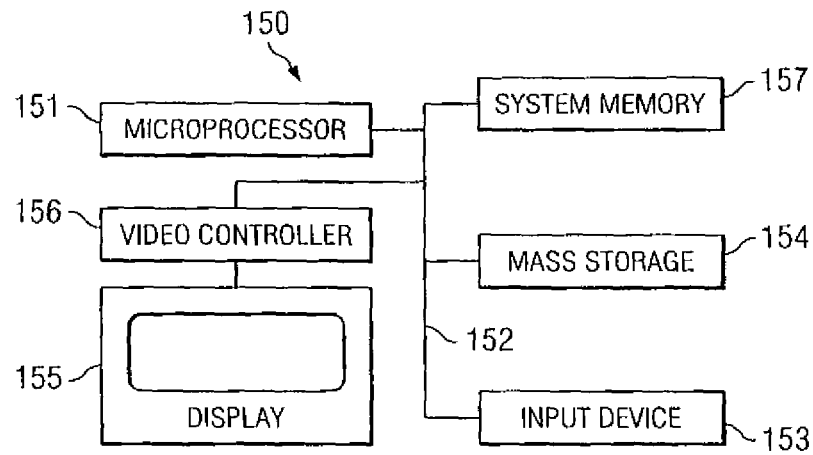
FIG. 5 is a diagrammatic view illustrating an embodiment of a computer system used to access the financial repository.

In one embodiment, computer system 150, FIG. 5, may be used to access the repository 400. The computer system 150 includes a microprocessor 151, which is connected to a bus 152. Bus 152 serves as a connection between microprocessor 151 and other components of computer system 150. An input device 153 is coupled to microprocessor 151 to provide input to microprocessor 151. Examples of input devices include keyboards, touchscreens, and pointing devices such as mouses, trackballs and trackpads. Programs and data are stored on a mass storage device 154, which is coupled to microprocessor 151. Mass storage devices include such devices as hard disks, optical disks, magneto-optical drives, floppy drives and the like. Computer system 150 further includes a display 155, which is coupled to microprocessor 151 by a video controller 156. A system memory 157 is coupled to microprocessor 151 to provide the microprocessor with fast storage to facilitate execution of computer programs by microprocessor 151. It should be understood that other busses and intermediate circuits can be deployed between the components described above and microprocessor 151 to facilitate interconnection between the components and the microprocessor.

In one example, the computer system 150, FIGS. 1 and 5, may be utilized in a system for accessing and managing financial accounts. The accessible repository 400 contains the asset accounts 404 and liability accounts 406 having independent sources 502-510. Computer system 150 is provided authorized access at 300 via the financial management software at 312 in a program stored at storage device 154 for accessing the repository at 400. Processor 151 is connected to storage device 154 and is operative with the program for accessing the repository.

In another example, voice response system (VRS) 308 may be utilized for managing financial accounts. The accessible repository 400 contains the asset accounts 404 and liability accounts 406 having independent sources 502-510. The authorized source 200 is provided access at 300 via the VRS at 308 to access the repository at 400.

In a further example, wireless device 310 may be utilized for managing financial accounts. The accessible repository 400 contains the asset accounts 404 and liability accounts 406 having independent sources 502-510. The authorized source 200 is provided access at 300 via the wireless device at 310 to access the repository at 400.

In operation, a method of managing financial accounts includes an accessible repository which contains an inventory of financial asset and liability accounts of, for example, an individual or a family in control of the management of the accounts. The accounts may be from independent sources and have no other connection except for being financially connected through the repository. However, some of the accounts may be connected outside of the repository. The repository is provided through the services of, for example, a financial management firm such as a bank, a brokerage firm, a mutual fund, a credit union, an insurance company, a credit card company, a financial agency and a financial services company.

The assets accounts may include, for example, a checking account, a savings account, a certificate of deposit (CD) account, a money market account, an annuity account, a credit card account, a line of credit account, a stock account, a bond account and a cash surrender value whole life insurance policy. The liability accounts may include, for example, a billing account, a mortgage account, a utility account, a credit card account, a loan account, a line of credit account, an insurance account, accounts payable, a subscriber account and customer deposits.

The repository is electronically accessible only by an authorized source which may include an individual (or individuals) in control of the management of the accounts, which mayor may not be the owner(s) of the accounts, or an authorized account associate. Access may be accomplished by various access channels including at least one of an Internet, intranet, voice response, wireless and financial management software connection with the repository. Access may be password or pin number protected for security purposes.

The electronically accessible account is provided in the repository. All financial asset and liability information of an account owner is input into the repository, and the repository is set up to be electronically accessible by the various access channels.

Financial accounts can then be managed through the electronically accessible repository which contains the inventory of financial asset and liability accounts which may all have independent sources. Access to the repository by an authorized source is provided through the various access channels for reviewing the status of any account in the repository, transferring an external account into the repository, creating a new account in the repository, transferring account adjustments into and out of the repository, making account adjustments within the repository, closing an account within the repository, presenting a bill to the repository and paying a bill from an account in the repository.

Figure 6:
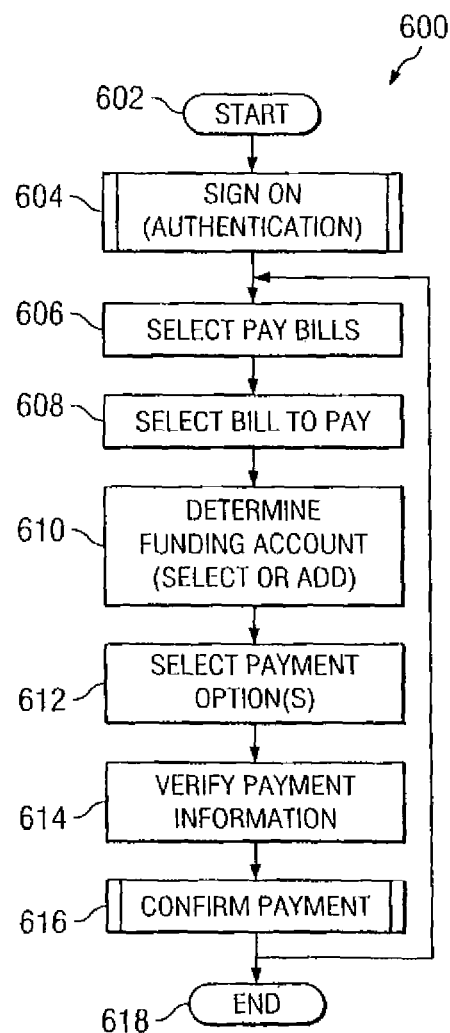
FIG. 6 is a diagrammatic view illustrating an embodiment utilizing the financial transaction system for payment of a bill.

FIG. 6 illustrates an example of a use of the repository by an authorized source for paying a bill at 600. The repository is accessed by one of the access modes mentioned above, and the process is started at step 602 by selecting and activating the access mode. In order to obtain access, authentication via security is required in order to sign on at step 604. This might be accomplished by providing an access code, e.g. a pin number. Once access is completed, a function selection is made to pay a bill at step 606, followed by the selection or identification of the specific bill to be paid at step 608. A selection is now required to provide the funding to pay the specific bill at step 610. This may be accomplished by, for example, transferring an amount of funds from an asset account to a liability account in the repository. In addition, an instruction is entered at step 612 as to the amount to be paid, for example, whether to pay a scheduled installment payment on the bill or whether to pay the bill in full. Verification may be made at step 614 that the bill has been paid in the correct amount and that the funds were provided from the correct account. Confirmation is provided that the designated payment has been made to the correct bill at step 616. If no other transactions are contemplated, the sequence can be ended at step 618. If however, another transaction is to be accomplished, the authorized source may return to make another function selection at step 606.

Figure 7:
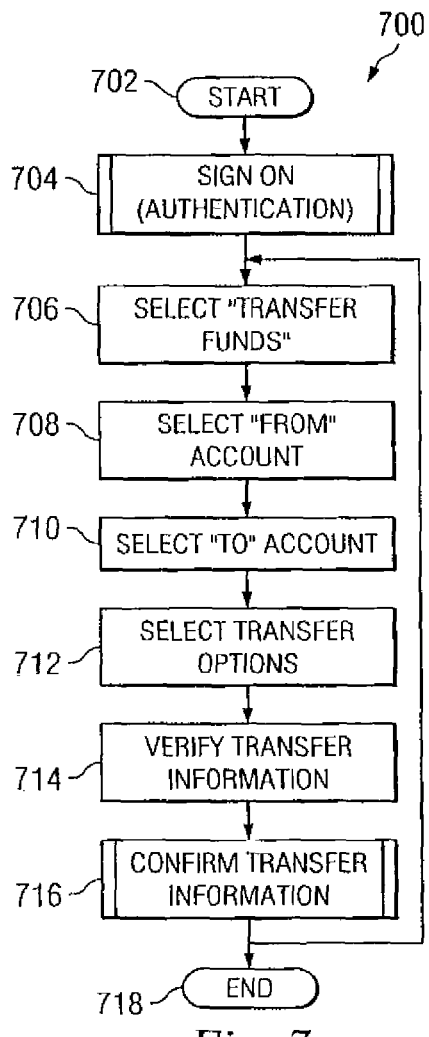
FIG. 7 is a diagrammatic view illustrating an embodiment utilizing the financial transaction system for transferring funds.

FIG. 7 illustrates an example of a use of the repository by an authorized source for transferring funds at 700. The repository is accessed by one of the access modes mentioned above, and the process is started at step 702 by selecting and activating the access mode. In order to obtain access, authentication via security is required in order to sign on at step 704. This might be accomplished by providing an access code, e.g. a pin number. Once access is completed, a function selection is made to transfer funds at step 706, followed by the selection or identification of the specific account(s) to transfer funds from at step 708. A selection is now required to select the specific account(s) to transfer the funds to at step 710. This may be accomplished by, for example, transferring an amount of funds from an asset account to a liability account in the repository. In addition, an instruction is entered at step 712 as to the amount(s) to be transferred and the transfer distribution of those funds. Verification may be made at step 714 that the funds have been transferred in the correct amount and that the funds were provided from and to the correct account(s). Confirmation is provided that the designated transfer has been made to the correct account(s) at step 716. If no other transactions are contemplated, the sequence can be ended at step 718. If however, another transaction is to be accomplished, the authorized source may return to make another function selection at step 706.

Figure 8:
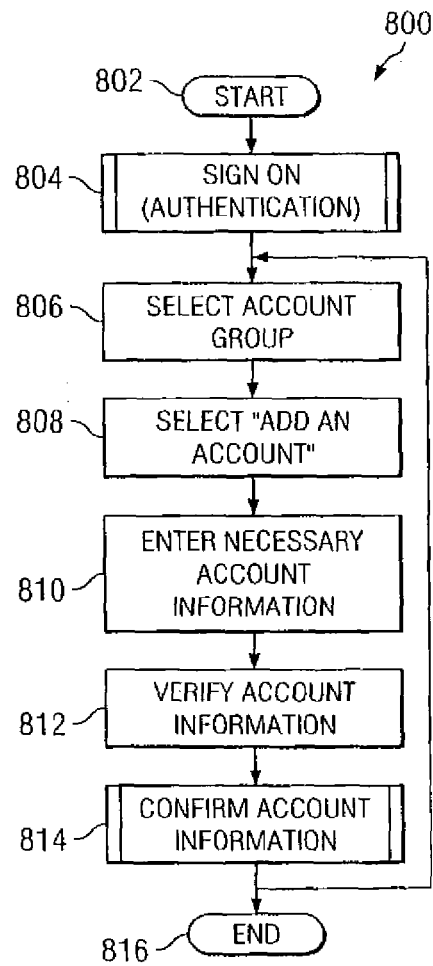
FIG. 8 is a diagrammatic view illustrating an embodiment utilizing the financial transaction system for adding accounts.

FIG. 8 illustrates an example of a use of the repository by an authorized source for adding an account or accounts at 800. The repository is accessed by one of the access modes mentioned above, and the process is started at step 802 by selecting and activating the access mode. In order to obtain access, authentication via security is required in order to sign on at step 804. This might be accomplished by providing an access code, e.g. a pin number. Once access is completed, a function selection is made to select an account group at step 806, which may be an asset or a liability account, followed by a function selection to add an account to the account group at step B08. A selection is now required to identify the specific account to add by entering specific account information at step B10.

Verification may be made at step 812 that the correct new account has been added to the correct account group. Confirmation is provided that the correct new account has been added to the correct account group at step B14. If no other transactions are contemplated, the sequence can be ended at step 816. If however, another transaction is to be accomplished, the authorized source may return to make another function selection at step 806.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed:

1. A computer-implemented method for managing financial accounts comprising: providing, using a computer, a repository that includes: a plurality of financial asset accounts, wherein some of the plurality of financial asset accounts have independent sources; and a plurality of liability accounts, wherein some of the plurality of liability accounts have independent sources, and wherein the independent sources are differing business entities; and providing access to the repository to an authorized source via an access channel.

2. The method of claim 1, wherein the plurality of financial asset accounts include at least one of a checking account, a savings account, a CD account, a money market account, an annuity account, a credit card account, a line of credit account, a stock account, a bond account, and a cash surrender value whole life insurance policy.

3. The method of claim 1, wherein the plurality of liability accounts include at least one of a billing account, a mortgage account, a utility account, a credit card account, a loan account, a line of credit account, an insurance account, accounts payable, a subscriber account, and customer deposits.

4. The method of claim 1, wherein providing access includes providing access to a status review of the plurality of financial asset accounts and the plurality of liability accounts.

5. The method of claim 4, wherein providing access to a status review includes providing current information regarding the plurality of financial asset accounts and the plurality of liability accounts.

6. The method of claim 1, wherein providing access includes at least one of providing access for transferring an external account into the repository, creating a new account in the repository, and closing an account within the repository.

7. The method of claim 1, wherein the method includes transferring an amount of funds from a financial asset account to a liability account in the repository.

8. The method of claim 7, wherein transferring the amount of funds from the financial asset account to the liability account includes transferring the amount of funds from a financial asset account with an independent source to a liability account with an independent source.

9. The method of claim 1, wherein the access channel includes at least one of Internet, intranet, voice response, automatic teller machine, wireless, and financial management software in connection with the repository.

10. A non-transitory computer-readable medium having computer executable instructions for managing financial accounts stored thereon that are executed by a processor to: provide, using a computer, a repository that includes a plurality of financial asset accounts and a plurality of liability accounts, wherein each of the plurality of financial asset accounts are independently sourced from one another and each of the plurality of liability accounts are independently sourced from one another, and wherein the independent sources are differing business entities; and provide access to the repository to an authorized source via an access channel.

11. The non-transitory computer-readable medium of claim 10, wherein the plurality of financial asset accounts are included in a financial asset account group.

12. The non-transitory computer-readable medium of claim 10, wherein the plurality of liability accounts are included in a liability account group.

13. The non-transitory computer-readable medium of claim 10, comprising instructions executed to provide a transfer of an external account into the repository.

14. The non-transitory computer-readable medium of claim 10, comprising instructions executed to provide a bill payment from an account in the repository.

15. The non-transitory computer-readable medium of claim 14, wherein the bill payment includes transferring an amount of funds from a financial asset account with an independent source to a liability account with an independent source.

16. A system, comprising:
a processor;
a memory storing computer-readable instructions for managing financial accounts, the computer-readable instructions executable by the processor to:
provide a repository that includes a plurality of financial asset accounts, wherein some of the plurality of financial asset accounts have an independent source, and a plurality of liability accounts, wherein some of the plurality of liability accounts have an independent source, and wherein the independent sources are differing business entities;
provide access to the repository to a user via an access channel; and
transfer an amount of funds from a financial asset account to a liability account in the repository.

17. The system of claim 16, wherein the user includes an authorized account executive and an individual in control of management of the account.

18. The system of claim 16, wherein the computer-readable instructions are executable by the processor to provide a status review of the plurality of financial asset accounts and the plurality of liability accounts.

19. The system of claim 16, wherein the independent sources are related through the repository.

20. The system of claim 16, wherein the repository is provided by a financial management firm that includes at least one of a bank, a brokerage firm, a mutual fund, a credit union, an insurance company, a credit card company, a financial agency, and a financial services company.

\* \* \* \* \*